US008325561B2

(12) United States Patent
Bull et al.

(10) Patent No.: US 8,325,561 B2
(45) Date of Patent: Dec. 4, 2012

(54) DIGITAL ELEVATION MODEL FOR USE WITH SEISMIC DATA ACQUISITION SYSTEMS

(75) Inventors: Andrew Bull, West Lothian (GB); John Barratt, East Lothian (GB); Scott T. Hoenmans, Arvada, CO (US); Martin C. Williams, Boulder, CO (US)

(73) Assignee: Inova Ltd., George Town, Grand Cayman (KY)

( * ) Notice: Subject to any disclaimer, the term of this patent is extended or adjusted under 35 U.S.C. 154(b) by 640 days.

(21) Appl. No.: 11/760,094

(22) Filed: Jun. 8, 2007

(65) Prior Publication Data

US 2007/0286023 A1    Dec. 13, 2007

Related U.S. Application Data

(60) Provisional application No. 60/812,468, filed on Jun. 10, 2006, provisional application No. 60/812,568, filed on Jun. 10, 2006.

(51) Int. Cl.
*G01V 1/28* (2006.01)
(52) U.S. Cl. .................. 367/59; 367/38; 367/77
(58) Field of Classification Search .............. 367/59–63, 367/38, 77
See application file for complete search history.

(56) References Cited

U.S. PATENT DOCUMENTS

| 3,733,584 A | 5/1973 | Pelton et al. |
| 3,806,864 A | 4/1974 | Broding et al. |
| 3,886,494 A | 5/1975 | Kostelnicek et al. |
| 4,086,504 A | 4/1978 | Ezell et al. |
| 4,236,234 A | 11/1980 | McDavid et al. |
| 4,296,485 A | 10/1981 | Clemens |
| 4,297,700 A | 10/1981 | Nard et al. |
| 4,366,561 A | 12/1982 | Klein |
| 4,628,494 A | 12/1986 | Rialan et al. |
| 4,639,901 A | 1/1987 | Warmack et al. |

(Continued)

FOREIGN PATENT DOCUMENTS

EP    0250280 A1    12/1987

(Continued)

OTHER PUBLICATIONS

LRS Quarterly, vol. 1, Issue 3, May 12, 2003.

(Continued)

*Primary Examiner* — Ian Lobo
(74) *Attorney, Agent, or Firm* — Mossman, Kumar & Tyler PC

(57) ABSTRACT

A seismic data acquisition system includes a controller, a plurality of sensor stations and a plurality of seismic sources. Each sensor station includes a sensor coupled to the earth for sensing seismic energy in the earth. The sensor provides a signal indicative of the sensed seismic energy and a recorder device co-located with the sensor unit that receives and stores the signals. A communication device is co-located with the sensor station and provides direct two-way wireless communication with the central controller. In one embodiment, in-field personnel determine elevation values, or Z values, for the sensor stations and seismic source by accessing a digital elevation model or a look-up table based on the digital elevation model. It is emphasized that this abstract is provided to comply with the rules requiring an abstract which will allow a searcher or other reader to quickly ascertain the subject matter of the technical disclosure. It is submitted with the understanding that it will not be used to interpret or limit the scope or meaning of the claims.

16 Claims, 7 Drawing Sheets

U.S. PATENT DOCUMENTS

| | | | |
|---|---|---|---|
| 4,644,506 A | 2/1987 | Cretin et al. |
| 4,661,934 A | 4/1987 | Carruth, Jr. |
| 4,725,992 A | 2/1988 | McNatt et al. |
| 4,807,200 A | 2/1989 | Montes et al. |
| 4,814,711 A | 3/1989 | Olsen et al. |
| 4,815,944 A | 3/1989 | Maruyama et al. |
| 4,885,724 A | 12/1989 | Read et al. |
| 4,905,205 A | 2/1990 | Rialan |
| 4,908,803 A | 3/1990 | Rialan |
| 4,967,400 A | 10/1990 | Woods |
| 4,979,152 A | 12/1990 | Rialan et al. |
| 5,189,642 A | 2/1993 | Donoho et al. |
| 5,206,835 A | 4/1993 | Beauducel |
| 5,276,655 A | 1/1994 | Rialan et al. |
| 5,351,244 A | 9/1994 | Rialan et al. |
| 5,363,094 A | 11/1994 | Staron et al. |
| 5,396,246 A | 3/1995 | Coquerel |
| 5,467,290 A | 11/1995 | Darland et al. |
| 5,481,502 A | 1/1996 | Cretin et al. |
| 5,523,761 A | 6/1996 | Gildea |
| 5,550,787 A | 8/1996 | Rialan et al. |
| 5,563,847 A | 10/1996 | Grouffal et al. |
| 5,617,371 A | 4/1997 | Williams |
| 5,623,455 A | 4/1997 | Norris |
| 5,627,798 A | 5/1997 | Siems et al. |
| 5,681,008 A | 10/1997 | Kinstler |
| 5,706,250 A | 1/1998 | Rialan et al. |
| 5,724,241 A | 3/1998 | Wood et al. |
| 5,745,074 A | 4/1998 | Laude |
| 5,829,520 A | 11/1998 | Johnson |
| 5,920,828 A * | 7/1999 | Norris et al. ............ 702/14 |
| 5,959,529 A | 9/1999 | Kail, IV |
| 5,978,313 A | 11/1999 | Longaker |
| 6,002,541 A | 12/1999 | Belser et al. |
| 6,002,640 A | 12/1999 | Harmon |
| 6,002,641 A | 12/1999 | Chien |
| 6,023,444 A | 2/2000 | Naville et al. |
| 6,061,299 A | 5/2000 | Grouffal et al. |
| 6,070,129 A | 5/2000 | Grouffal et al. |
| 6,078,283 A | 6/2000 | Bednar |
| 6,208,247 B1 | 3/2001 | Agre et al. |
| 6,208,626 B1 | 3/2001 | Brewer |
| 6,219,620 B1 | 4/2001 | Park et al. |
| 6,226,601 B1 | 5/2001 | Longaker |
| 6,255,962 B1 | 7/2001 | Tanenhaus et al. |
| 6,255,969 B1 | 7/2001 | Crayford |
| 6,332,109 B1 | 12/2001 | Sheard et al. |
| 6,353,577 B1 | 3/2002 | Orban et al. |
| 6,430,106 B1 | 8/2002 | Staron |
| 6,469,639 B2 | 10/2002 | Tanenhaus et al. |
| 6,553,316 B2 | 4/2003 | Bary et al. |
| 6,560,565 B2 | 5/2003 | Roy et al. |
| 6,677,894 B2 | 1/2004 | Sheynblat et al. |
| 6,711,475 B2 | 3/2004 | Murphy |
| 6,847,896 B1 | 1/2005 | Orban et al. |
| 6,898,529 B2 | 5/2005 | Gao et al. |
| 6,934,219 B2 | 8/2005 | Burkholder et al. |
| 6,944,096 B2 | 9/2005 | Lemenager et al. |
| 6,977,867 B2 | 12/2005 | Chamberlain |
| 7,016,260 B2 | 3/2006 | Bary |
| 7,034,711 B2 | 4/2006 | Sakatani et al. |
| 7,050,355 B2 | 5/2006 | Robertsson et al. |
| 7,224,642 B1 | 5/2007 | Tran |
| 7,292,943 B2 | 11/2007 | Elder et al. |
| 2001/0030907 A1 | 10/2001 | Bachrach |
| 2003/0111268 A1 | 6/2003 | Alft et al. |
| 2004/0037165 A1 | 2/2004 | Lemenager et al. |
| 2004/0156267 A1 | 8/2004 | O'Brien et al. |
| 2004/0252585 A1 | 12/2004 | Smith et al. |
| 2004/0257913 A1 | 12/2004 | Ray et al. |
| 2005/0177310 A1 | 8/2005 | Duncan et al. |
| 2005/0276162 A1 | 12/2005 | Brinkmann et al. |
| 2006/0086497 A1 | 4/2006 | Ohmer et al. |
| 2006/0145881 A1 | 7/2006 | Sakatani et al. |

FOREIGN PATENT DOCUMENTS

| | | |
|---|---|---|
| EP | 0552769 A2 | 7/1993 |
| WO | WO9812577 A1 | 3/1998 |
| WO | WO9818022 A1 | 4/1998 |
| WO | WO9960424 A1 | 11/1999 |

OTHER PUBLICATIONS

408UL Reference Training Guide, Firmware Network Description, Jan. 13, 2000, pp. 13-1 to 13-18.

SGR II, Seismic Group Recorder System: High technology with a track record., Global Universal Sciences, Inc., 1984, pp. 1-6.

SGR III, Seismic Group Recorder System, Global Universal Sciences, Inc., 1985, pp. 1-4.

* cited by examiner

DIGITAL ELEVATION MODEL FOR USE WITH SEISMIC DATA ACQUISITION SYSTEMS

CROSS-REFERENCE TO RELATED APPLICATIONS

This application claims the benefit of and takes priority from U.S. Provisional application 60/812,468 filed on Jun. 10, 2006, which is hereby incorporated herein by reference. This application also claims the benefit of and takes priority from U.S. Provisional application 60/812,568 filed on Jun. 10, 2006, which is hereby incorporated by reference. This Application is related to U.S. patent application Ser. No. 10/664,566, filed on Sep. 17, 2003 titled "Single Station Wireless Seismic Data Acquisition Method and Apparatus," which is hereby incorporated by reference for all purposes.

BACKGROUND OF THE DISCLOSURE

Oil companies conduct seismic surveying to lower risk and to reduce costs of locating and developing new oil and gas reserves. Seismic surveying is, therefore, an up front cost with intangible return value. Consequently minimizing the cost of seismic surveying and getting quality results in minimum time are important aspects of the seismic surveying process.

Seismic surveys are conducted by deploying a large array of seismic sensors over a terrain of interest. These arrays may cover over 50 square miles and may include 2000 to 5000 seismic sensors. An energy source such as buried dynamite may be discharged within the array to impart a shockwave into the earth. The resulting shock wave is an acoustic wave that propagates through the subsurface structures of the earth. A portion of the wave is reflected at underground discontinuities, such as oil and gas reservoirs. These reflections are then sensed at the surface by the sensor array and recorded as seismic data. Such sensing and recording are referred to herein as seismic data acquisition. This seismic data is then processed to generate a three dimensional map, or seismic image, of the subsurface structures. The map may be used to make decisions about drilling locations, reservoir size and pay zone depth. One step in the processing of the seismic data is the integration of survey data and other information with the seismic data. For instance, the position of each sensor, such as longitude, latitude and elevation, must be integrated or associated with the seismic data acquired by that sensor. Conventionally, this integration is performed at a processing facility after the seismic data has been acquired in the field. However, this post-acquisition step of data integration may be susceptible to errors, which may reduce the accuracy of the generated map and negatively impact decisions made using the generated map.

SUMMARY OF THE DISCLOSURE

The present disclosure includes devices and methods enhancing the accuracy of the processing of seismic data acquired by seismic surveys. In one aspect, the present disclosure enhances such accuracy by efficiently determining in-field the location coordinates X (longitude), Y (latitude), Z (elevation) of seismic devices, e.g., source or sensor station, used in a seismic survey spread. In one embodiment, a device for determining a Z value of a seismic device in a seismic survey spread includes a memory module loaded with a subset of Z values selected from a predetermined Z value database. The predetermined Z value database may be a digital elevation model (DEM) formed using convention elevation data collection means such as Light Detecting and Ranging (LiDAR). The Z value data subset may be formed by extracting Z values from the DEM using a preset criteria such as a geometric shape, a mathematical relationship, a geographical parameter, a topological parameter or other criteria. The criteria may be used to select Z values that may be required or filter out Z values that likely will not be required. The extracted Z values may be structured in the form of a conventional lookup table that may be queried by using X and Y coordinates. In one aspect, the device for determining a Z value may include a processor that uses a computer program having instructions to receive Z values from a data elevation (DEM) database; to receive a location parameter from a location sensor such as a GPS device; to select a Z value for a received location parameter; and to transmit the selected Z value to a seismic device such as a seismic sensor. The computer program may also include instructions to store the received Z values in a look-up table.

During use, the memory module is queried using a search parameter such as an X and Y coordinate to retrieve a given Z value. The memory module may be positioned in a hand-held device, a mobile computer station, a central controller, or a stationary server. The retrieved Z value is inputted either manually or automatically into a seismic device such as a sensor station. The sensor station may integrate or associate the Z value with the detected seismic data. Of course, X and Y values may also be associated with the detected seismic data. Thereafter, when the seismic data from the sensor station is downloaded or otherwise accessed, the seismic data will already be integrated or associated with the precise Z value, and possibly X and Y values, of that sensor station.

It should be understood that examples of the more important features of the disclosure have been summarized rather broadly in order that a detailed description thereof that follows may be better understood, and in order that the contributions to the art may be appreciated. There are, of course, additional features of the disclosure that will be described hereinafter and will form the subject of the claims appended hereto.

BRIEF DESCRIPTION OF THE DRAWINGS

The novel features of this disclosure, as well as the disclosure itself, will be best understood from the attached drawings, taken along with the following description, in which similar reference characters refer to similar parts, and in which.

DETAILED DESCRIPTION OF THE DISCLOSURE

Figure 1:
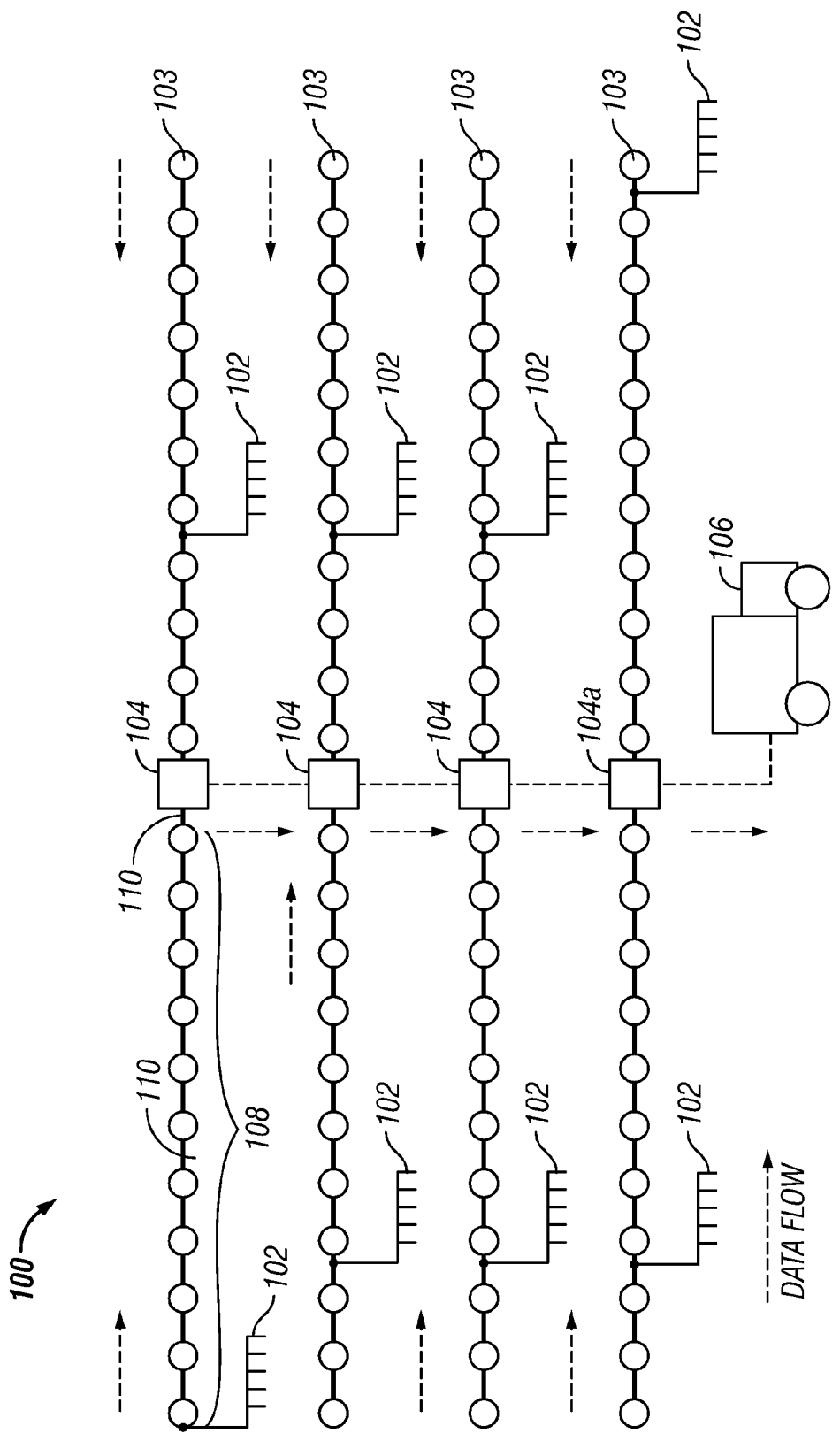
FIG. 1 represents a cable seismic data acquisition system.

In aspects, the present disclosure relates to devices and methods for controlling activities relating to seismic data acquisition and for processing data acquired during such activities. The present disclosure is susceptible to embodiments of different forms. There are shown in the drawings, and herein will be described in detail, specific embodiments of the present disclosure with the understanding that the present disclosure is to be considered an exemplification of the principles of the disclosure, and is not intended to limit the disclosure to that illustrated and described herein.

The methods and devices of the present disclosure may be utilized with any type of seismic data acquisition system wherein survey data, such as x, y, and z coordinates, may be integrated into acquired seismic data. For context, the equipment and components of two such systems are discussed below.

FIG. 1 depicts a typical cable-based seismic data acquisition system 100. The typical system 100 includes an array (string) of spaced-apart seismic sensor units 102. Each string of sensors is typically coupled via cabling to a data acquisition device (field box) 103, and several data acquisition devices and associated string of sensors are coupled via cabling 110 to form a line 108, which is then coupled via cabling 110 to a line tap or (crossline unit) 104. Several crossline units and associated lines are usually coupled together and then to a central controller 106 housing a main recorder (not shown). One sensor unit 102 that is in use today is a velocity geophone used to measure acoustic wave velocity traveling in the earth. Other sensor units 102 that may be used are acceleration sensors (accelerometers) for measuring acceleration associated with the acoustic wave. Each sensor unit may comprise a single sensor element or more than one sensor element for multi-component seismic sensor units.

The sensors 102 are usually spaced at least on the order of tens of meters, e.g., 13.8-220.0 feet. Each of the crossline units 104 may perform some signal processing and then store the processed signals as seismic information for later retrieval. The crossline units 104 are each coupled, either in parallel or in series with one of the units 104a serving as an interface with between the central controller 106 and all crossline units 104.

Figure 2:
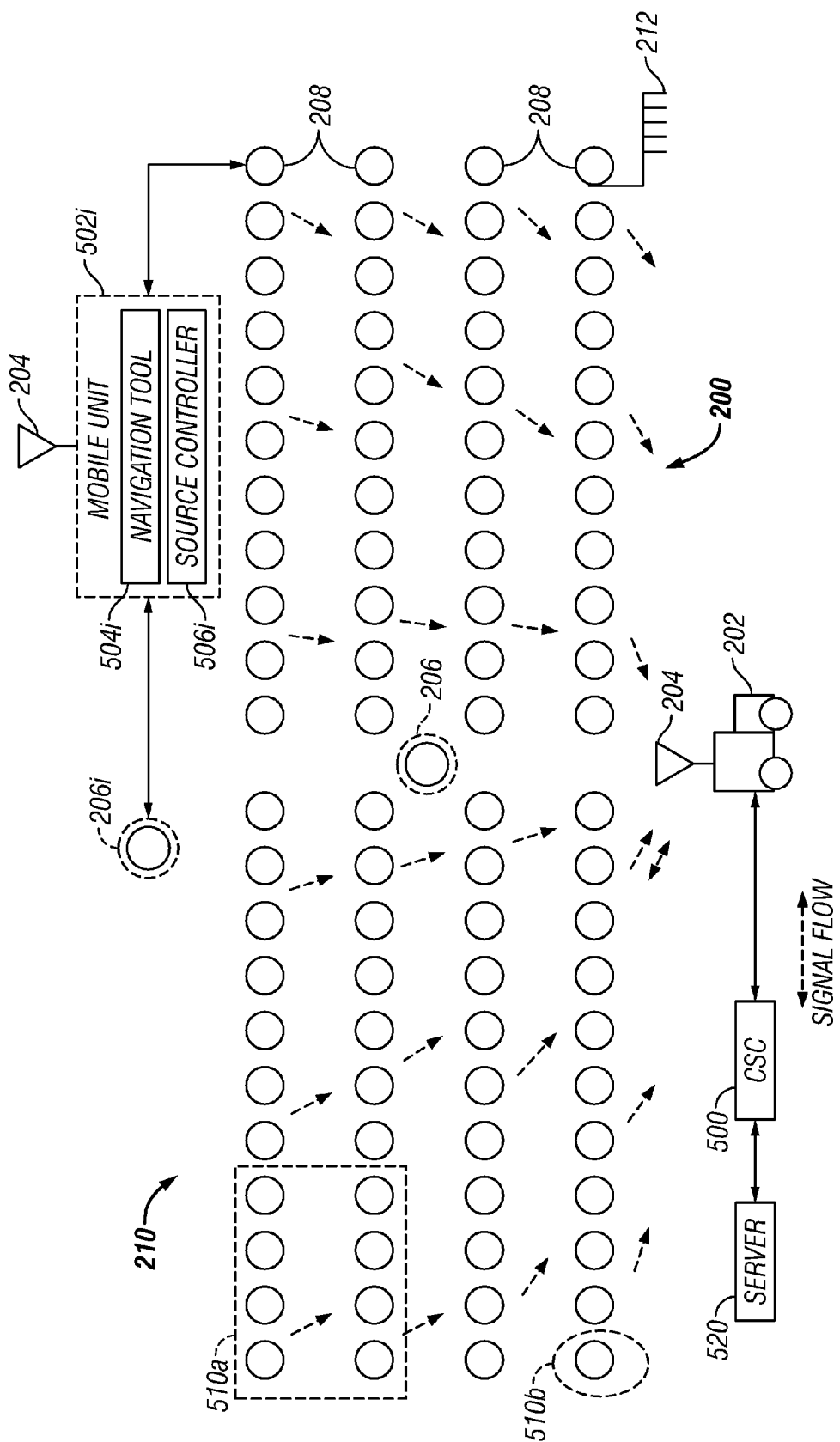
FIG. 2 schematically illustrates a wireless seismic data acquisition system.

Referring to FIG. 2 there is schematically shown a wireless seismic data acquisition system. The system 200 includes a central controller 202 in direct communication with each of a number of wireless sensor stations 208 forming an array (spread) 210 for seismic data acquisition. Each sensor station 208 includes one or more sensors 212 for sensing seismic energy. Direct communication as used herein refers to individualized data flow as depicted in FIG. 2 by dashed arrows. The data flow may be bi-directional to allow one or more of: transmitting command and control instructions from the central controller 202 to each wireless sensor station 208; exchanging quality control data between the central controller 202 and each wireless sensor station 208; and transmitting status signals, operating conditions and/or selected pre-processed seismic information from each wireless sensor station 208 to the central controller 202. The communication may be in the form of radio signals transmitted and received at the central controller 202 via a suitable antenna 204. The term "seismic devices" includes any device that is used in a seismic spread, including, but not limited to, sensors, sensor stations, receivers, transmitters, power supplies, seismic sources, control units, etc.

The system 200 may operate in a passive mode by sensing natural or random seismic energy traveling in the earth. The system 200 may operate in an active mode using a seismic energy source 206, e.g., pyrotechnic source, vibrator truck, compressed gas, etc., to provide seismic energy of a known magnitude and source location. In many applications, multiple seismic energy sources may be utilized to impart seismic energy into a subterranean formation. A representative seismic energy source is designated with numeral 206i. Typically, activation (or more commonly, "shooting" or "firing") of the source 206i is initiated locally by a mobile unit 502i. In one embodiment, the mobile unit 502i includes a human operator who may utilize a navigation tool 504i to navigate to a source 206i and a source controller 506i to fire the source 206i. To navigate the terrain and to determine precise location coordinates, the navigation tool 504i may be equipped with a global positioning satellite device (GPS device) and/or a database having predetermined coordinates (e.g., z coordinates). It should be understood that a GPS device is merely illustrative of sensors that may be utilized to determine a position or location of a device or point of interest. Other devices may include inertial navigation devices, compasses, the Global Navigational Satellite System (GNSS), or suitable system for obtaining position or location parameters.

The controller 202, the central station computer (CSC) 500 and a central server 520 exert control over the constituent components of the system 200 and direct both human and machine activity during the operation of the system 200. The server 520 may be programmed to manage data and activities over the span of the seismic campaign, which may include daily shooting sequences, updating the shots acquired, tracking shooting assets, storing seismic data, pre-processing seismic data and broadcasting corrections. Of course, a single controller may be programmed to handle most if not all of the above described functions. For example, the CSC 500 may be positioned in or integral with the controller 202. Moreover, in some applications it may be advantageous to position the controller 202 and CSC 500 in the field, albeit in different locations, and the server 520 at a remote location.

Figure 3A:
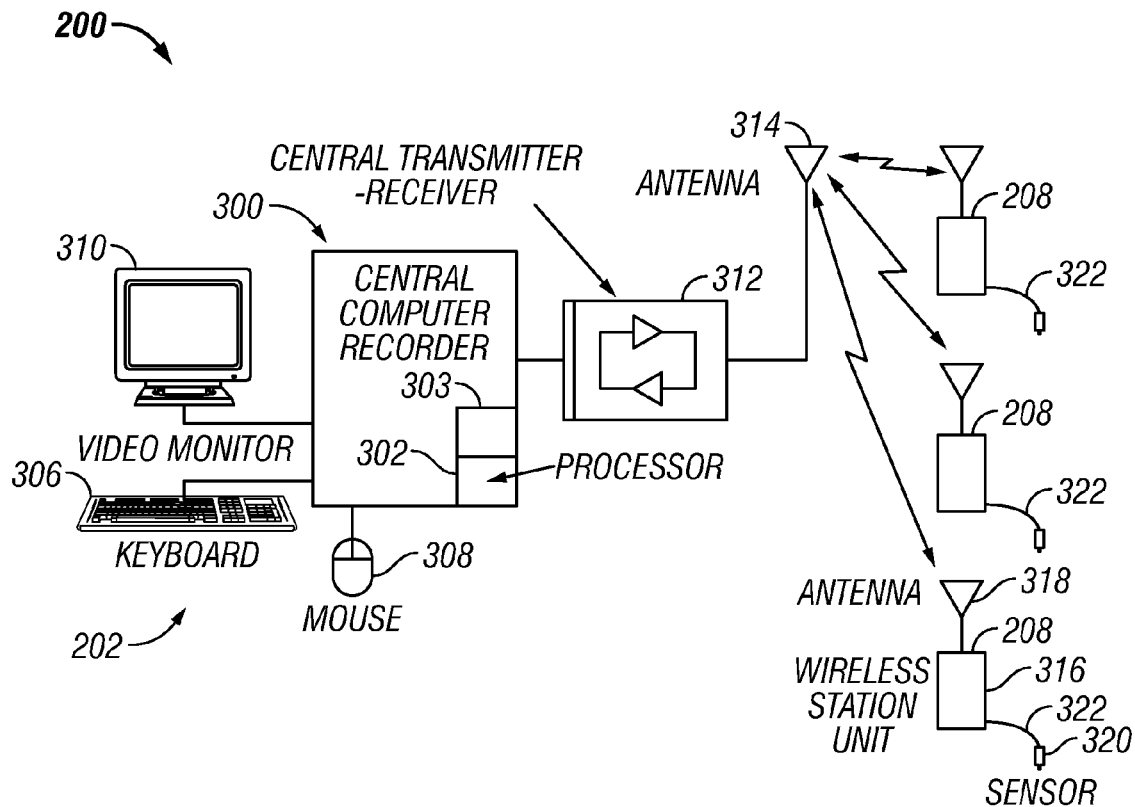
FIG. 3A shows a schematic representation of the system of FIG. 2 in more detail.

FIG. 3A is a schematic representation of the system 200 in more detail. The central controller 202 includes a computer 300 having a processor 302 and a memory 303. An operator may interface with the system 200 using a keyboard 306 and mouse or other input 308 and an output device such as a monitor 310. Communication between remotely-located system components in the spread 210 and the central controller 202 is accomplished using a central transmitter-receiver (transceiver) unit 312 disposed in the central controller 202 along with an antenna 314.

Figure 3B:
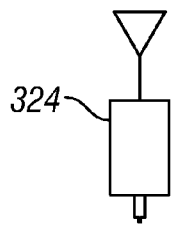
FIG. 3B shows one embodiment of a wireless station unit having an integrated seismic sensor.

The central controller 202 communicates with each wireless sensor station 208. Each wireless sensor station 208 shown includes a wireless station unit 316, an antenna 318 compatible with the antenna 314 used with the central controller 202, and a sensor unit 320 responsive to acoustic energy traveling in the earth co-located with a corresponding wireless sensor station. Co-located, as used herein, means disposed at a common location with one component being within a few feet of the other. Therefore, each sensor unit 320 may be coupled to a corresponding wireless station unit by a relatively short cable 322, e.g., about 1 meter in length, or coupled by integrating a sensor unit 320 with the wireless station unit 316 in a common housing 324 as shown in FIG. 3B.

The sensor unit 320 may be a multi-component sensor (not shown) that includes a three-component accelerometer sensor incorporating micro electro-mechanical systems (MEMS) technology and application-specific integrated circuits (ASIC) as found in the Vectorseis sensor module available from Input/Output, Inc., Stafford, Tex. The present disclosure, however, does not exclude the option of using velocity sensors such as a conventional geophone or using a pressure sensor such as a conventional hydrophone. Any sensor unit capable of sensing seismic energy will provide one or more advantages of the present disclosure. Furthermore, the present disclosure is useful using a single sensor unit 320 as shown, or the sensor unit 320 may include multiple sensors connected in a string.

Figure 4:
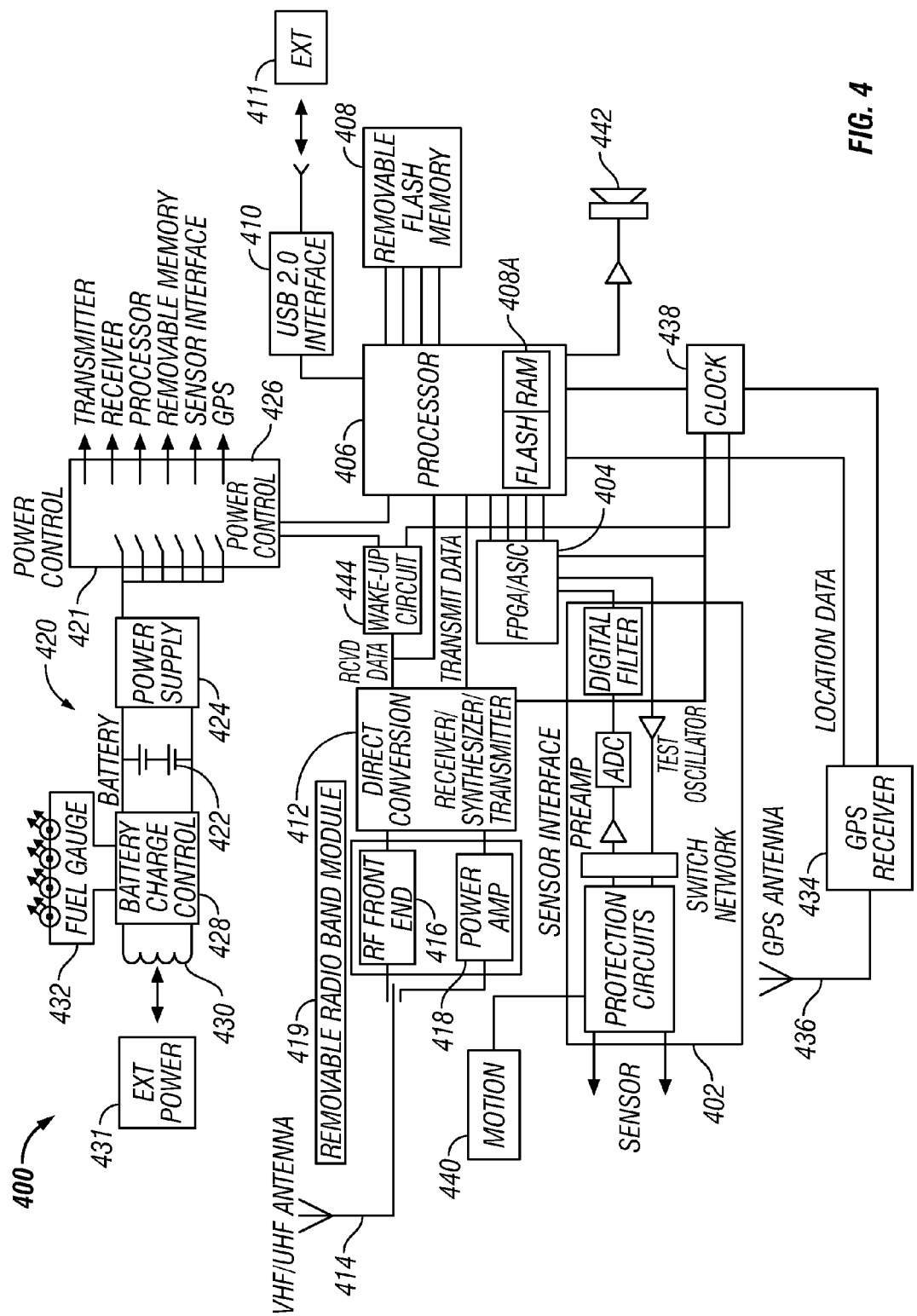
FIG. 4 is a schematic representation of a wireless station unit incorporating circuitry to interface with an analog output sensor unit.

FIG. 4 is a schematic representation of a wireless station unit 400 that operates as a data recorder incorporating circuitry to interface with an analog output sensor unit (not shown). In other embodiments, the wireless station unit 400 may incorporate circuitry to interface with a digital output sensor unit as discussed in co-pending and commonly assigned U.S. patent application Ser. No. 10/664,566, which is hereby incorporated by reference for all purposes. The wireless station unit 400 is an acquisition device that includes a sensor interface 402 to receive an output signal from the sensor unit. The sensor interface 402 shown includes a protection circuit, switch network, a preamplifier, a test oscillator, and ADC and digital filtering circuits to pre-process the received signal. The sensor interface 402 is controlled in part by a field programmable gate array (FPGA) and/or an ASIC controller circuit 404. An on-board local processor 406 processes the signal to create storable information indicative of the seismic energy sensed at the sensor unit. The information may be in digital form for storage in a storage device 408, also referred to herein as a memory unit. The memory unit may be removable as shown at 408 and/or dedicated 408a with a coupling 410 for providing access to the stored information and/or for transferring the stored information to an external storage unit 411. The coupling 410 may be a cable coupling as shown or the coupling may be an inductive coupling or an optical coupling. Such couplings are known and thus are not described in detail.

The memory 408, 408a may be a nonvolatile memory of sufficient capacity for storing information for later collection or transmission. The memory may be in the form of a memory card, removable miniature hard disk drive, an Electrically-Erasable Programmable Read Only Memory (EEPROM) or the like.

A memory card, also known as a flash memory card or a storage card, is a small storage medium used to store digital information and is suitable for use in seismic prospecting. Flash memory is a type of nonvolatile memory that may be erased and reprogrammed in units of memory called blocks. It is a variation of an EEPROM, which unlike flash memory, is erased and rewritten at the byte level. Thus, updating a flash memory is typically faster than updating an EEPROM.

Interface with the central controller 202 is accomplished with a communication device such as an on-board transmitter-receiver circuit 412, and an antenna 414 selected for the desired transmitting/receiving frequency to provide direct communication with the remotely-located central controller 202. The transmitter/receiver circuit 412 shown is a direct conversion receiver/synthesizer/transmitter circuit and may alternatively be implemented as a software defined radio transceiver. Alternatively, the transmitter/receiver circuit 412 may be any suitable circuit providing transceiver functions such as a transceiver utilizing superheterodyne technology, for example. The antenna 414 may include a VHF/UHF antenna. Other circuitry may include a radio frequency (RF) front end circuit 416 and a power amplifier 418 for enhancing communication with the central controller 202. These circuits may advantageously be in the form of a removable radio band module 419 to allow operation over a broad frequency band when used with replaceable antennas. A direct conversion radio transceiver provides the advantages of operation over a broad frequency band, allows smaller overall size for the station unit 400, and reduces overall weight for field-transportable units.

In both cable and wireless seismic data acquisition system, location parameters, which include latitude, longitude, azimuth, inclination, elevation, heading (e.g., relative to north), tilt relative to gravity, etc., depth associated with a particular sensor unit 320 help to correlate data acquired during a survey. Location parameters may be in reference to a conventional reference, e.g., magnetic north, or an arbitrary reference frame for a particular survey area. The location parameters may utilize Cartesian-type coordinates, polar coordinate or another other suitable coordinate system. In the case of the FIG. 1 cable system, the location parameters may relate to the sensor 102 and/or field box 103. In the case of the FIG. 2 wireless system, the location parameters may relate to a particular wireless sensor station 208 and/or a sensor unit 320 help to correlate data acquired during a survey. For ease of explanation, reference will be made herein to the FIG. 2 system.

To efficiently conduct a seismic field survey using the above-described systems, the location coordinates X (longitude), Y (latitude) of every source 206i and sensor station 208 may be determined in the field. Additionally, it may be advantageous to make in-field determination of Z (elevation), in addition to in-field determinations of X and Y coordinates and to program the sensor stations 208 with their respective X, Y, and Z coordinates. For instance, the data acquired by the sensor stations 208 may be integrated or associated in-situ with the X, Y, Z coordinates of the respective sensor stations 208, which may reduce or eliminate pre-processing that would otherwise be required before processing the acquired seismic data.

During operations, each mobile unit 502i carries a navigation tool 504i that uses a GPS device 506 or other suitable location sensor to identify the exact placement of each seismic survey source 206i or sensor station 208 during layout of the spread 210 and to guide the mobile unit 502i back to each unit's location during "shooting" and retrieval. It should be understood that a reference to placement, location or position of the sensor station 208 is meant as a reference to placement, location or position of the station unit 316 and/or the sensor 320 (FIG. 3A). Although GPS devices may be effective for determining the X and Y coordinates, in-field determination of the Z value ("Z") may be less accurate and time-consuming to retrieve. The term Z value is generally mean to cover a measurement or quantitative value relative to a known or preset vertical datum. The Z value may include an elevation, an altitude or a depth and may relate to ground, above ground, underground and underwater measurements. Elevation or Z values may be more easily accessed using a digital elevation model (DEM). A digital elevation model is a representation of the topography of the Earth in digital format, i.e., by X, Y coordinates and numerical descriptions of elevation or altitude. One suitable means for developing accurate Z values is through the use of LiDAR technology. LiDAR uses a mechanism mounted beneath airplanes to read an area's topography and provide accurate elevation data. The data generated by LiDAR is used to form the digital elevation model (DEM). Other suitable means of developing elevation data will be known to those skilled in the art. Discussed below are exemplary systems and methods of accessing and utilizing such Z values while in the field.

Figure 5:
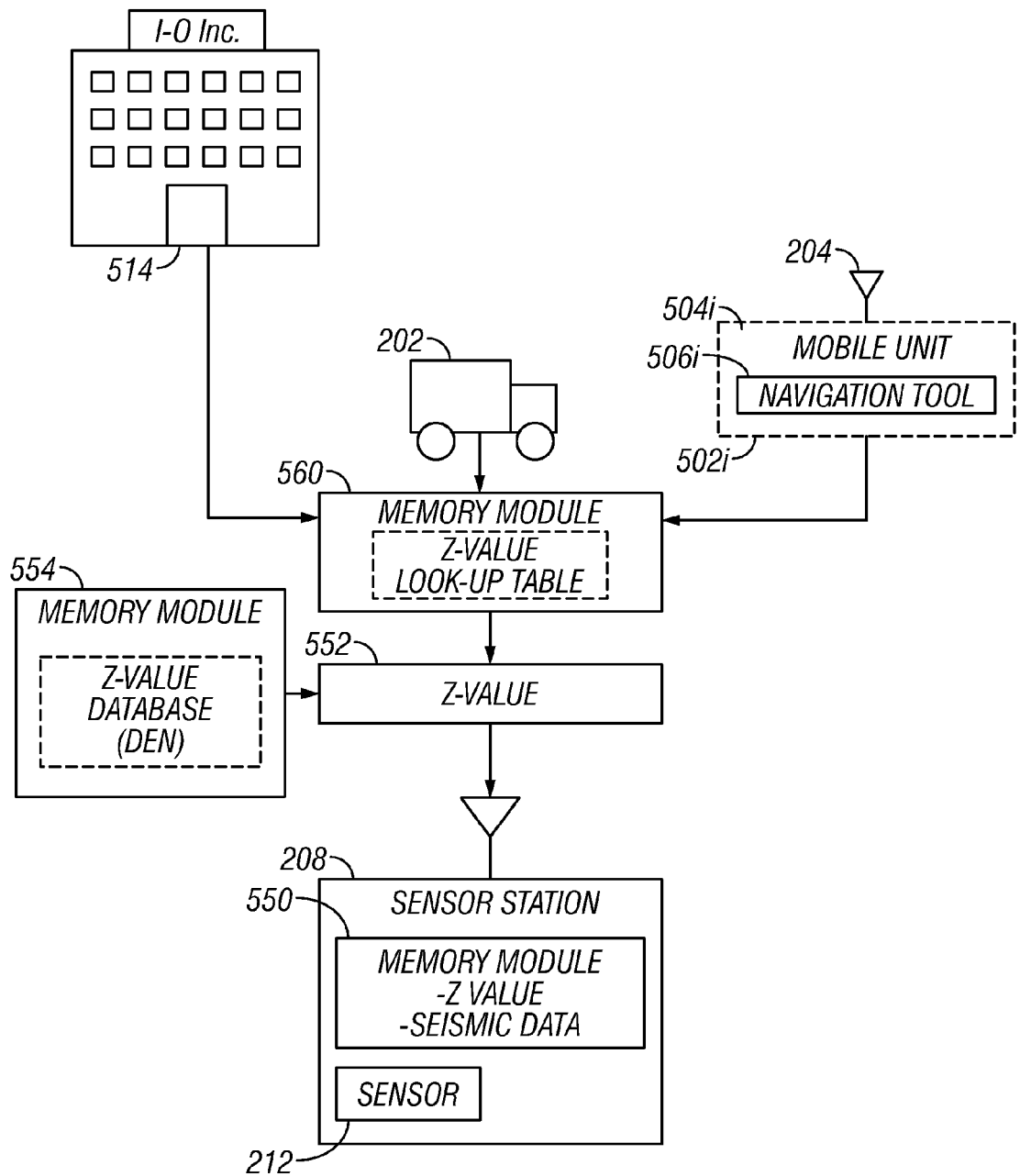
FIG. 5 is a flow chart of representing exemplary devices for in-field determination of Z values according to the present disclosure.

Referring now to FIGS. 2 and 5, there are schematically shown several illustrative devices for in-field determination of Z values, each of which may be used independently or in concert with one another. As shown in FIG. 5, an exemplary sensor station 208 includes a memory module 550 for storing a Z value 552. The sensor station 208 is programmed to integrate, associate or link the Z value 552 with the seismic data acquired by the associated sensor 212 during the seismic survey activity. For example, the Z value may be entered into a trace header of the sensor station 208. Thus, the acquired seismic data later retrieved from the sensor station 208 will already have an associated Z value. These illustrative devices for in-field determination and utilization of Z values are discussed in further detail below.

In one arrangement, the sensor station 208 communicates directly with a memory module 554 loaded or written with a Z coordinate database that includes Z values for the entire seismic spread 210. For example, the Z coordinate database may be in the form of a digital elevation model. The memory module 554 may be positioned within a navigation tool 206, at a central controller 202, or at a server 520 positioned at a remote location. As may be appreciated, the Z coordinate database could include a substantial volume of data because all of the Z readings for an entire survey area are stored and accessed to determine the Z value of the sources 206i and sensor stations 208. In addition to requiring a processor with relatively large memory capacity, retrieving a Z value from such a large database may be time-consuming and require significant processing power. Nevertheless, in certain applications, the data storage capacity and processing power may be available to accommodate such an arrangement.

In other situations, it may be advantageous to extract certain Z values from a DEM to form a subset of Z values that may be loaded into a suitable memory module. For convenience, such a Z value subset will be referred to as a DEM look-up table 560. As used herein, the term "lookup table" refers generally to a data structure, such as an array or associative array, that replaces a processing intensive computation with a simpler lookup operation. In one embodiment, LiDAR values are used to create the digital elevation model (DEM) wherein Z values are associated with corresponding X, Y values. The DEM look-up table is built by extracting Z values from the DEM in accordance with a predetermined criteria or methodology. For example, referring now to FIG. 2, Z values may be extracted for only a defined region 510a of the spread 210. Such an arrangement could be applicable wherein the field of activity for a mobile unit 502i is limited to the geographical area within the defined region 510a. Thus, each mobile unit 206i may be loaded with a different lookup table. That is, each mobile unit 206i may be assigned a limited and defined region 510a based on a determined work flow, survey plan, etc. In another method, only the Z values for a defined area 510b surrounding a sensor station 208 are extracted into the look-up table 560. Still other methods may include extraction of Z values based on predicted routes of travel of mobile units 206i. For instance, the probability of a route taken by a mobile unit 502i may be analyzed using the DEM for the survey area and considering conditions such as topography, vegetation, restrictions, boundaries, hazards, etc. For an area with a narrow probable path either due to topography or boundaries, e.g., a narrow valley or a strip between restricted areas, fewer possible Z values may be required. Yet, for an area with a broad probable path, e.g., open fields or gentle slopes, more possible Z values may be required.

These methods, which may be complementary, are merely illustrative of the methodologies that may be used to selectively extract Z values from the DEM. Thus, generally speaking, embodiments of the present disclosure decimate or pare down a DEM to a relatively smaller sized lookup table or data structure. This DEM lookup table includes only the Z values that are predicted either by a predetermined model or by human estimation to be needed during a seismic survey. Stated differently, the DEM lookup table eliminates or screens out the vast majority of the Z values in the DEM that are unlikely to be associated with a location of a seismic device such as a sensor station or source. Advantageously, the smaller size look-up table may be better suited for use by portable or hand held devices or devices that have limited storage or processing capabilities.

Referring to FIG. 5, the lookup table 560 due to its relatively smaller size may be loaded into any number of devices; e.g., the navigation tool 506i carried by the mobile unit 502i, the central controller 202, and/or in a remote location 514 such as an office building. The sensor station 208 may receive the Z values from any of the above-listed locations via a suitable communication system, including wired transmissions and wireless communication links. Thus, in embodiments, the navigation tool 506i may include a processor that uses a computer program having instructions to first receive Z values from a data elevation (DEM) database such as that store in module 554. Thereafter, while in the field, the computer program executes instruction to receive a location parameter from a location sensor such as a GPS device and to select a Z value for a received location parameter. Then, the computer program executes instructions to transmit the selected Z value to a seismic device such as a sensor station 208. The computer program may also include instructions to store the Z values received from the module 554 in the lookup table 560.

Figure 6:
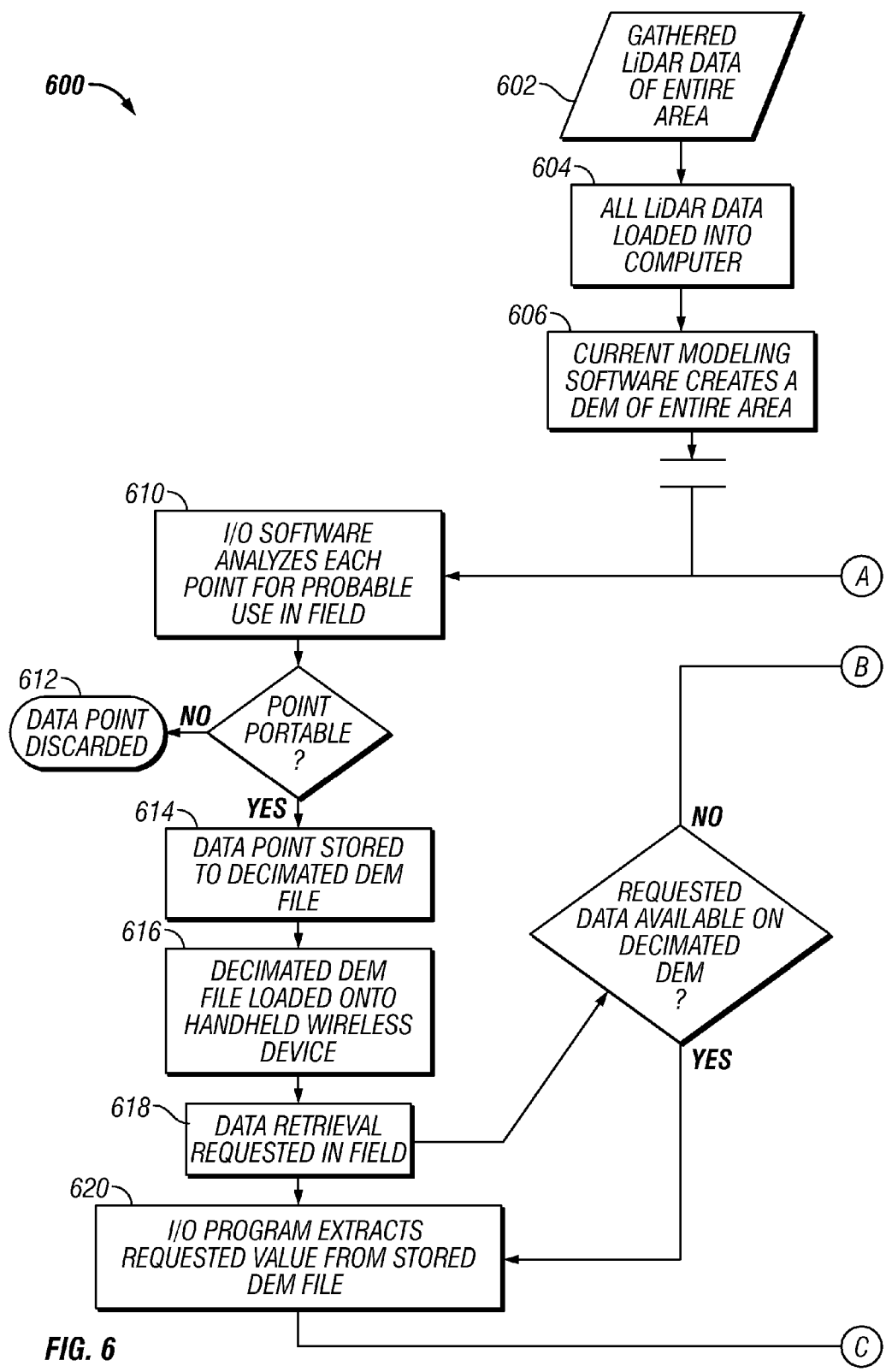
FIG. 6 is a flow chart of representing one exemplary method of in-field determination of Z value according to the present disclosure.
Figure 6:
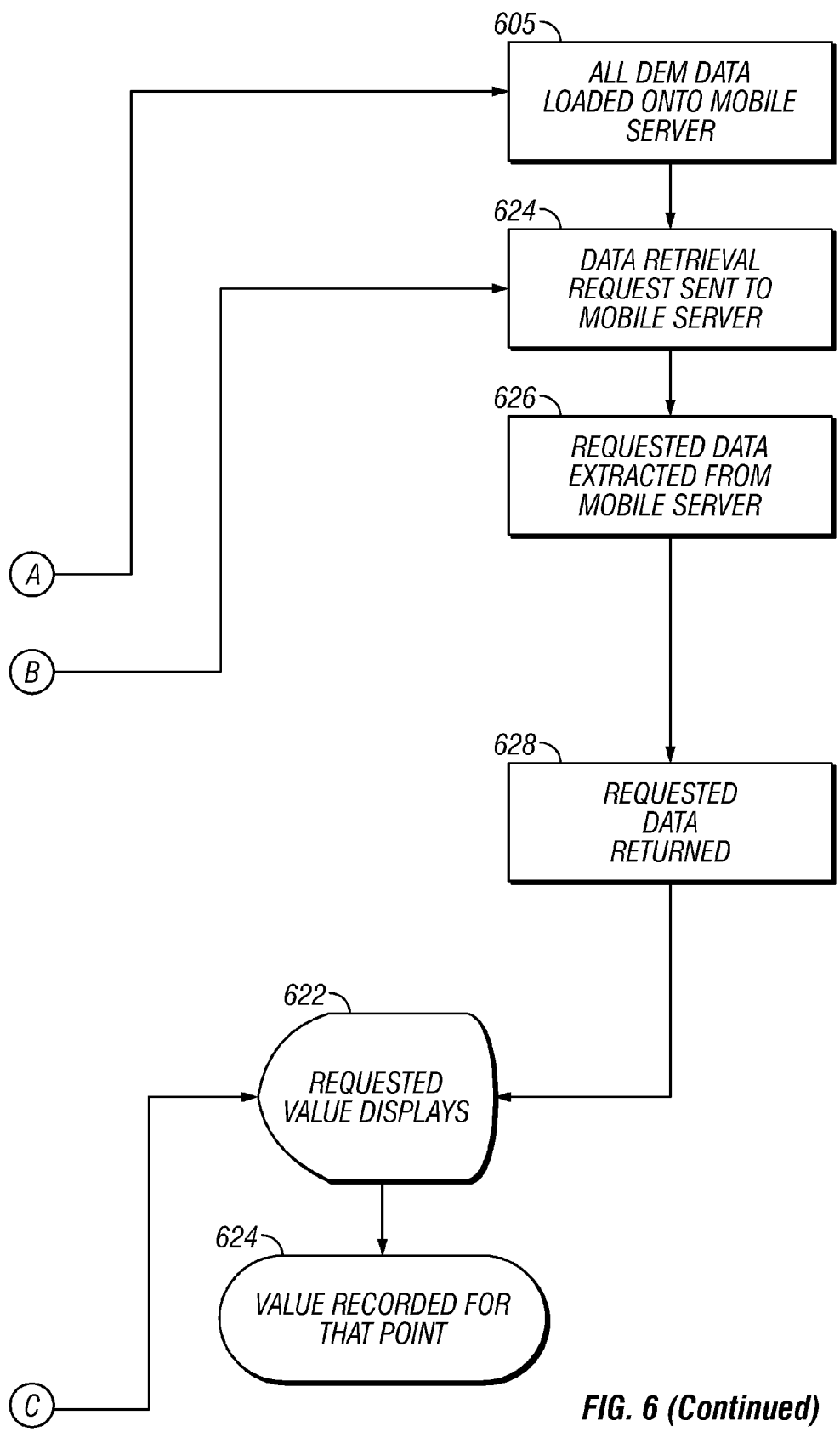

Referring now to FIG. 6, there is shown one exemplary method 600 for developing and utilizing a DEM lookup table 560 (FIG. 5). At step 602, Z values are gathered or calculated for a defined region such as an entire seismic spread utilizing conventional means. At step 604, these values are loaded into a computer and at step 606 processed according to programmed instructions to create a digital elevation model (DEM). At step 605, the entire DEM is loaded into a mobile server 520 at the central controller 202 (FIG. 2). Of course, the entire DEM may also be loaded into a processor located elsewhere. At step 610, a preset extraction model is applied to the DEM to create a DEM lookup table. The preset model determines whether a given Z value is likely to be required during operations. If the Z value is unlikely to be needed, then that Z value is discarded at step 612. Z values likely to be needed are stored in the DEM lookup table at step 614. At step 616, the created DEM lookup table may be uploaded or transferred into a memory module of any number of electronic devices such as a lap top computer or a suitable configured hand-held device such as the navigation tool 504i (FIG. 2) or the seismic sensor 208 (FIG. 2). Exemplary memory modules include computer readable media such as hard drives, flash drives, CD ROM, ROM, and RAM. At step 618, a mobile unit 502i (FIG. 2) or other human operator deploys the electronic device in the field and requests that a specified Z value be retrieved from the DEM lookup table. For example, the mobile unit 502i may input a GPS-determined X,Y coordinate and the extraction program will extract the Z value corresponding to the inputted X,Y coordinate. If the requested Z value is available, then at step 620, a query program in the electronic device retrieves a Z value from the DEM lookup table. At step 622, the Z value is displayed on the electronic device. At step 624, the Z value is inputted into the seismic station 208 (FIG. 2). The Z value may be inputted manually or automatically. If the requested Z value is not available in the DEM lookup table at step 618, then the Z value may be requested from the DEM at the mobile server at step 624. At step 626, the Z value is extracted from the DEM and at step 628, the requested Z value is returned to the navigation tool, displayed at step 622, and inputted into the sensor station 208 (FIG. 2) at step 624. Alternative to the steps of 624, the mobile unit 502*i* may return to the base and retrieve an additional z values.

Thus, the Z parameters are determined prior accessing the seismic data acquired by the sensor stations 208 and are stored in a memory 303, 408 either in the central controller or in the station unit 400. Although the in-field utilization of Z values has been discussed in connection with the FIG. 2 seismic survey system, it should be appreciated that the above teachings may also be advantageously applied to cable seismic systems or any other type of seismic data acquisition system.

The foregoing description is directed to particular embodiments of the present disclosure for the purpose of illustration and explanation. It will be apparent, however, to one skilled in the art that many modifications and changes to the embodiment set forth above are possible without departing from the scope of the disclosure. It is intended that the following claims be interpreted to embrace all such modifications and changes.

What is claimed is:

1. An apparatus for seismic data acquisition that is used with a server having a database that includes Z-coordinates for a selected geographical area of interest, wherein each Z-coordinate is a value relative to a known vertical datum, the apparatus comprising:
   a seismic device having a memory configured to store detected seismic data and a Z-coordinate; and
   a navigation tool having a memory module containing a set of Z-coordinates, associated with corresponding X and Y coordinates, the navigation tool being configured to: (i) communicate with the server to receive the set of Z-coordinates, (ii) select the Z-coordinate based on a GPS determined X and Y coordinate, and (iii) transmit the Z-coordinate to the seismic device.

2. The apparatus of claim 1 further comprising an electronic device associated with the memory module located at the seismic device, wherein the seismic device accessible to the memory module is configured to be planted to acquire data.

3. The apparatus of claim 1 further comprising a location sensor associated with the navigation tool for determining an X and Y coordinate for the seismic device.

4. The apparatus of claim 1 wherein the navigation tool is positioned on land at one of: (i) in a human held device, and (ii) a mobile platform.

5. The apparatus of claim 1, wherein the seismic device includes a plurality of seismic devices configured to access the navigation tool.

6. The apparatus of claim 1 wherein the database is created using light detecting and ranging techniques (LiDAR).

7. The apparatus of claim 1 wherein the seismic device communicates with the navigation tool using a wireless communication link.

8. The apparatus of claim 1 wherein the z coordinate is a value relating to one of: (i) an elevation, (ii) a depth below a surface of the earth, (iii) an altitude and (iv) a vertical datum.

9. An apparatus for determining a Z value of a seismic device in a seismic survey spread, comprising:
   a navigation tool having a memory module loaded with a subset of Z values selected from a predetermined Z value database, the memory module being searchable to retrieve the Z value, wherein each Z value of the subset of Z values is a value relative to a known vertical datum and is associated with a corresponding X and Y value, wherein the navigation tool is configured to: (i) communicate with a processor to obtain the subset of Z-values, (ii) select a Z-value based on a GPS determined X and Y coordinate, and (iii) transmit the Z-value to the seismic device.

10. The apparatus of claim 9 wherein the processor selects the subset of Z values for loading into the memory module located at the seismic device.

11. The apparatus of claim 10 wherein the processor selects Z values based, at least in part, on one of (i) a geometric shape, (ii) a mathematical relationship, (iii) a geographical parameter, and (iv) a topological parameter.

12. The apparatus of claim 11 wherein the processor selects Z values using a specified geographical area and a field activity associated with the specified geographical area, wherein the geographical area is land based.

13. The apparatus of claim 9 wherein the subset of Z values is structured as a lookup table for land coordinates.

14. The apparatus of claim 13 wherein the lookup table is queried using a location parameter.

15. A computer-readable medium that is accessible to a processor for executing instructions contained in a computer program embedded on the computer-readable medium, wherein the computer program comprises:
   a set of instructions to receive Z values from a digital elevation (DEM) database in a server, wherein each Z value is a value relative to a known vertical datum and is associated with a location parameter;
   a set of instructions to receive the location parameter from a location sensor in a navigation tool;
   a set of instructions to select a Z value for the received location parameter; and
   a set of instructions to transmit the selected Z value from the navigation tool to a seismic device.

16. The computer-readable medium of claim 15, wherein the computer program further comprises a set of instructions to store the received Z values in a look-up table, and the computer-readable medium is located at the seismic device.

* * * * *